United States Patent
Li et al.

(10) Patent No.: US 11,814,737 B2
(45) Date of Patent: Nov. 14, 2023

(54) PROCESS FOR PRODUCING ALLOY NANOPARTICLES

(71) Applicant: Danmarks Tekniske Universitet, Kgs. Lyngby (DK)

(72) Inventors: Qingfeng Li, Brøndby Strand (DK); Benedikt Axel Brandes, Copenhagen (DK); Jens Oluf Jensen, Valby (DK); Lars Nilausen Cleeman, Hørsholm (DK); Yang Hu, Virum (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 23 days.

(21) Appl. No.: 17/280,455

(22) PCT Filed: Sep. 27, 2019

(86) PCT No.: PCT/EP2019/076175
§ 371 (c)(1),
(2) Date: Mar. 26, 2021

(87) PCT Pub. No.: WO2020/065005
PCT Pub. Date: Apr. 2, 2020

(65) Prior Publication Data
US 2021/0379659 A1 Dec. 9, 2021

(30) Foreign Application Priority Data

Sep. 28, 2018 (EP) .................................. 18197742

(51) Int. Cl.
*B22F 9/24* (2006.01)
*C25B 11/04* (2021.01)
(Continued)

(52) U.S. Cl.
CPC .............. *C25B 11/04* (2013.01); *B22F 1/054* (2022.01); *B22F 9/24* (2013.01); *C22C 1/0466* (2013.01);
(Continued)

(58) Field of Classification Search
None
See application file for complete search history.

(56) References Cited

U.S. PATENT DOCUMENTS 5,024,905 A 6/1991 Itoh et al.
5,876,867 A 3/1999 Itoh et al.
(Continued)

FOREIGN PATENT DOCUMENTS

CN 103212422 A * 7/2013
CN 102834174 B * 11/2017
(Continued)

OTHER PUBLICATIONS

English translation of CN 103212422 A (originally published Jul. 24, 2013) obtained from PE2E search.*
(Continued)

*Primary Examiner* — George Wyszomierski
(74) *Attorney, Agent, or Firm* — Knobbe Martens Olson & Bear LLP (57) ABSTRACT

The present invention relates to a process for the production of metal alloy nanoparticles which catalyse the oxygen reduction reaction (ORR) for use in proton exchange membrane fuel cells (PEMFC) or electrolyser cells. In particular, the present invention relates to a process for producing alloy nanoparticles from platinum group metals and other metals under reductive conditions. In particular the present invention relates to a process for producing alloy nanoparticles comprising the steps of mixing a salt of at least one metal, a material comprising a platinum group metal, a nitrogen-
(Continued)

rich compound, and optionally a support material, to provide a precursor mixture, and heating said precursor mixture to a temperature of at least 400° C., in the presence of a gas comprising hydrogen ($H_2$), to provide said alloy nanoparticles.

41 Claims, 8 Drawing Sheets

(51) Int. Cl.
  *C25B 11/089* (2021.01)
  *C22C 1/04* (2023.01)
  *H01M 4/92* (2006.01)
  *B22F 1/054* (2022.01)
  *H01M 8/10* (2016.01)

(52) U.S. Cl.
  CPC .......... *C25B 11/089* (2021.01); *H01M 4/921* (2013.01); *B22F 2301/25* (2013.01); *H01M 2008/1095* (2013.01)

(56) References Cited

U.S. PATENT DOCUMENTS

| | | | |
|---|---|---|---|
| 5,939,220 A | 8/1999 | Gunner et al. | |
| 6,232,264 B1 | 5/2001 | Lukehart et al. | |
| 2005/0235776 A1* | 10/2005 | He | B22F 1/145 75/255 |
| 2008/0280753 A1* | 11/2008 | Watanabe | B82Y 30/00 502/101 |
| 2013/0133483 A1* | 5/2013 | Yang | B22F 9/22 75/363 |
| 2016/0149229 A1 | 5/2016 | Li et al. | |
| 2018/0131008 A1 | 5/2018 | Mukerjee et al. | |
| 2019/0036128 A1* | 1/2019 | Martinez Bonastre | H01M 4/925 |
| 2022/0355282 A1* | 11/2022 | Ryoo | B01J 35/002 |

FOREIGN PATENT DOCUMENTS

| | | |
|---|---|---|
| WO | WO 2014/005599 A1 | 1/2014 |
| WO | WO 2017/191126 A1 | 11/2017 |

OTHER PUBLICATIONS

English translation of CN 102834174 B (originally published Novembers, 2017) obtained from PE2E search.*

Asano et al., "Oxygen Reduction Reaction Activity for Strain-Controlled Pt-Based Model Alloy Catalysts: Surface Strains and Direct Electronic Effects Induced by Alloying Elements", ACS Catalysis, vol. 6, pp. 5285-5289, 2016.

Chen et al., "Highly Crystalline Multimetallic Nanoframes with Three-Dimensional Electrocatalytic Surfaces", Science, vol. 343, pp. 1339-1343, 2014.

Escudero-Escribano et al., "$Pt_5Gd$ as a Highly Active and Stable Catalyst for Oxygen Electroreduction", Journal of The American Chemical Society, vol. 134, pp. 16476-16479, 2012.

Escudero-Escribano et al., "Tuning the activity of Pt alloy electrocatalysts by means of the lanthanide contraction", Electrocatalysis, vol. 352, No. 6281, pp. 73-76, 2016.

Greeley et al., "Alloys of platinum and early transition metals as oxygen reduction electrocatalysts", Nature Chemistry, vol. 1, pp. 552-556, 2009.

Hernandez-Fernandez et al., "Mass-selected nanoparticles of $Pt_xY$ as model catalysts for oxygen electroreduction", Nature Chemistry, vol. 6, pp. 732-738, 2014.

Hu et al., "Hollow Spheres of Iron Carbide Nanoparticles Encased in Graphitic Layers as Oxygen Reduction Catalysts**", Angewandte Chemical International Education, vol. 53, pp. 3675-3679, 2014.

Hu et al., "$Fe_3C$—based oxygen reduction catalysts: synthesis, hollow spherical structures and applications in fuel cells", Journal of Materials Chemistry A, vol. 3, pp. 1752-1760, 2015.

Hu et al., "Platinum Iron Intermetallic Nanoparticles Supported on Carbon Formed In Situ by High-Pressure Pyrolysis for Efficient Oxygen Reduction", ChemCatChem, vol. 8, pp. 3131-3136, 2016.

Huang et al., "High-performance transition metal-doped $Pt_3Ni$ octahedra for oxygen reduction reaction", Science, vol. 348, No. 6240, pp. 1230-1234, 2015.

Kanady et al., "Synthesis of $Pt_3Y$ and other Early-Late Intermetallic Nanoparticles by way of a Molten Reducing Agent", pp. S1-S15.

Kanady et al., "Synthesis of $Pt_5Y$ and Other Early-Late Intermetallic Nanoparticles by Way of a Molten Reducing Agent", Journal of the American Chemical Society, vol. 139, pp. 5672-5675, 2017.

Roy et al., "Scalable Synthesis of Carbon Supported Platinum-Lanthanide and Rare Earth Alloys for Oxygen Reduction", in 5 pages.

Roy et al., "Scalable Synthesis of Carbon-Supported Platinum-Lanthanide and -Rare-Earth Alloys for Oxygen Reduction", ACS Catalysis, vol. 8, pp. 2071-2080, 2018.

Velazquez-Palenzuela et al., "The enhanced activity of mass-selected $Pt_xGd$ nanoparticles for oxygen electroreduction", Journal of Catalysis, vol. 328, pp. 297-307, 2015.

Wang et al., "Structurally ordered intermetallic platinum-cobalt core-shell nanoparticles with enhanced activity and stability as oxygen reduction electrocatalysts", Nature Materials, vol. 12, pp. 81-87, 2013.

Wang et al., "Carbon-Supported Pt-Based Alloy Electrocatalysts for the Oxygen Reduction Reaction in Polymer Electrolyte Membrane Fuel Cells: Particle Size, Shape, and Composition Manipulation and Their Impact to Activity", Chemical Reviews, vol. 115, pp. 3433-3467, 2015.

International Search Report received in Application No. PCT/EP2019/076175 dated Dec. 17, 2019.

* cited by examiner

PROCESS FOR PRODUCING ALLOY NANOPARTICLES

CROSS REFERENCE TO RELATED APPLICATIONS

This application is a U.S. National Phase Application of PCT International Application Number PCT/EP2019/076175, filed on Sep. 27, 2019, designating the United States of America and published in the English language, which is an International Application of and claims the benefit of priority to European Patent Application No. 18197742.2, filed on Sep. 28, 2018. The disclosures of the above-referenced applications are hereby expressly incorporated by reference in their entireties.

TECHNICAL FIELD OF THE INVENTION

The present invention relates to a process for the production of alloy nanoparticles which catalyse the oxygen reduction reaction (ORR) for use in e.g. proton exchange membrane fuel cells (PEMFC) or electrolyser cells. In particular, the present invention relates to a process for producing alloy nanoparticles from platinum group metals and other metals under reductive conditions. In particular the present invention relates to a process for producing alloy nanoparticles comprising the steps of mixing a salt of at least one metal, a material comprising a platinum group metal, a nitrogen-rich organic compound, and optionally a support material, to provide a precursor mixture, and heating said precursor mixture to a temperature of at least 400° C., in the presence of a gas comprising hydrogen ($H_2$), to provide said alloy nanoparticles.

BACKGROUND OF THE INVENTION

Fuel cells are a highly efficient and environmentally benign technology to convert chemical energy directly into electric energy. Among them, low-temperature polymer electrolyte membrane fuel cells (PEMFC) are recognized as a promising power source for fossil fuel-free cars and other applications including portable or stationary. Currently, a major challenge for the wide application of this technology lies in the high cost of platinum (Pt) and the high catalyst loading needed in the fuel cell cathode due to the sluggish oxygen reduction reaction (ORR). Hence, it is highly necessary to decrease the Pt usage at PEMFC cathodes. The most viable route to achieve this target is to improve the catalytic activity of Pt or platinum group metals by alloying. This strategy has been explored extensively over the past two decades, mainly focusing on alloys of Pt and late transition metals such as Ni, Co, and Fe. Though with initial activity enhancement by alloying, these transition metals tend to leach out from the alloy structure during fuel cell operation, resulting in the decreased performance. Recent theoretical calculations and experimental results of model alloy nanoparticles prepared by magnetron sputtering (in the scale of microgram) demonstrated that alloys of Pt and rare earth metals, such as Gd, Tb, Dy, are good Pt alloy catalysts in terms of activity, as well as stability. Rare earth metals have much negative alloying energies with Pt and hence inherently more stable during fuel cell operation. Nonetheless, these alloys have not yet been produced by a scalable method that allows for practical application, which is generally applicable to both rare earths and other metals for potential alloying with platinum group metals.

One major obstacle for the synthesis of e.g. Pt-rare earth metal (Pt-RE) alloy catalysts is the substantial difference between the standard reduction potential of Pt and that for rare earth metals, e.g. 1.188 V for $Pt^{2+}$ and −2.279 V for $Gd^{3+}$. Furthermore, the rare earth metals tend to form very stable oxides once in contact with water or oxygen. Hence, there is a general consensus that the chemical synthesis of this type of catalysts is only possible in oxygen- and water-free environment. Besides, a very strong reducing agent is needed, for reducing rare earth metal ions such as $Gd^{2+}$ and $Y^{3+}$.

Thus, J. S. Kanady et al., *J. Am. Chem. Soc.*, 2017, 139, 5672-5675 discloses a process for producing $Pt_xY$ alloy nanoparticles in the 5-20 nm size range. The process requires a high purity environment and uses molten borohydride salt ($MEt_3BH$, M=Na, K), as both the reducing agent and reaction medium. Platinum and yttrium are provided as halide salts of the metals, e.g. $PtCl_4$ and $YCl_3$. The grey powder following the reduction step is annealed at 650° C. for 2 hours, and the resulting $Pt_xY$ nanoparticles washed in acid. It is not suggested to add cyanamide or any other organic compound to achieve the formation of alloy nanoparticles in even less strict conditions.

C. Roy et al., *ACS Catal.*, 2018, 8, 2071-2080 discloses a process for producing $Pt_xY$ alloy nanoparticles, and possibly also other platinum rare-earth metal alloys, by reducing $YCl_3$ with hydrogen gas at 800° C. However, the article does not suggest to add nitrogen-rich compounds or any other organic compound to assist the formation of alloy nanoparticles in even less strict conditions.

WO 2017/191126 discloses a chemical process for preparing nanoparticles of an alloy comprising both a noble metal such as platinum, palladium, gold and mixtures thereof, and a non-noble transition or lanthanide metal, such as yttrium, gadolinium or terbium. The process is carried out by reduction with hydrogen gas while any volatile species are removed by the gas stream. Addition of cyanamide or any other organic compound to assist the alloy formation is not disclosed by the article.

U.S. Pat. No. 6,232,264 discloses preparation of nanocomposites and their use as fuel cell catalysts. The method makes use of precursor complexes, such as a binuclear Pt/Ru complex wherein said metals are connected by organic ligands. A precursor complex may be dissolved in acetonitrile to facilitate deposition of the precursor onto a support material. Acetonitrile is removed by evaporation prior annealing. Therefore, the process does not disclose the annealing of a precursor mixture comprising a nitrogen rich compound. Also, the present invention disclaims the use of acetonitrile.

US 2018/0131008 discloses nitrogen-functionalized platinum-transition metal catalysts for use in a proton exchange membrane electrolyzer. The catalysts may be prepared by aqueous dispersion of the Pt metal and transition metal and in the presence of a nitrogen complexing agent. The process is however not for the formation of alloy nanoparticles, and annealing is not performed in the presence of hydrogen as for the present invention.

US 2016/0149229 discloses the preparation of a non-platinum catalyst comprising metal-carbide particles (Fe, Ni, Co, Ti, Cu, or Mn) for use in fuel cells and electrolysers. The method of preparation includes high temperature treatment of a metal and a carbon precursor in a nitrogen purged autoclave in a glove box. The carbon precursor (such as cyanamide) is added to form spherical structures that function as template for development of the catalyst material.

The present invention relates to platinum group metal or gold alloys, and not metal carbide structures.

Y. Hu et al., *J. Mater. Chem. A*, 2015, 3, 1752-1760 discloses a process for preparing $Fe_3C$ nanoparticles for use as ORR catalysts in an autoclave pyrolysis reaction at 500-800° C. which is conducted under an inert $N_2$ atmosphere. Cyanamide is added to the reaction mixture to form a graphitic layer that encapsulate the $Fe_3C$ nanoparticles. The article discloses only Fe based nanoparticles which are not alloys and the process does not involve reduction by a hydrogen containing gas.

Y. Hu et al., *Chem Cat Chem*, 2016, 8, 3131-3136 discloses a process for preparing PtFe/C alloy catalysts by one-pot high-temperature pyrolysis of a precursor containing Pt, Ferrocene (Fe(0)) and cyanamide. No reductive annealing of platinum group metals or gold is disclosed.

Hence, an improved process for producing alloy nanoparticles of platinum group metals or gold with other metals would be advantageous, and in particular a more efficient and/or broadly applicable process for alloying such metals under reductive conditions, with less demands on the ambient conditions, would be advantageous.

SUMMARY OF THE INVENTION

Thus, an object of the present invention relates to providing a process for the production alloy nanoparticles of platinum group metals or gold and other metals under reductive conditions, which is scalable, and more facile due to less demand for inert atmosphere during production.

In particular, it is an object of the present invention to provide a process for the production of alloy nanoparticles of platinum group metals or gold with other metals under reductive conditions that solve the above mentioned problems of the prior art, such as the need for highly inert conditions, free of moisture and oxygen, lack of scalability, and inability to produce alloys of platinum group metals and metals with a much lower standard reduction potential, such as e.g. rare earth metals. The process of the present invention further provides for alloy nanoparticles with reduced sintering during annealing, which e.g. results in good catalytic performance as compared to e.g. platinum nanoparticles, and alloys made by other processes.

Thus, one aspect of the invention relates to a process for producing alloy nanoparticles comprising the steps of:
a) mixing:
  a salt of at least one first metal selected from the group consisting of alkaline earth metals, transition metals, and lanthanides, or mixtures thereof,
  a material comprising a platinum group metal or a material comprising gold (Au),
  a nitrogen-rich organic compound, and
  optionally a support material,
  to provide a precursor mixture,
b) heating said precursor mixture to a temperature of at least 400° C., in the presence of a gas comprising hydrogen ($H_2$), to provide said alloy nanoparticles, wherein the nitrogen-rich organic compound has a chemical formula with a stoichiometric ratio between carbon to nitrogen of 6:1-1:4, and with the proviso that the nitrogen-rich organic compound is not acetonitrile.

A second aspect of the present invention relates to an alloy nanoparticle obtainable by the process according to the first aspect of the present invention.

A third aspect of the present invention relates to an alloy nanoparticle obtained by the process according to the first aspect of the present invention.

A fourth aspect of the present invention relates to a proton exchange membrane fuel cell (PEMFC) or an electrolyzer cell comprising alloy nanoparticles according to the second or third aspect of the present invention.

BRIEF DESCRIPTION OF THE FIGURES

FIG. 2, a) shows a TEM image of a sample of $Pt_xGd/C$ nanoparticles prepared according to the procedure described in example 2. b) depicts a high-resolution HAADF-STEM image of a typical nanoparticle in the sample. c) shows an EDS line profile measured along the line in FIG. 2b) that present the content and distribution of platinum and gadolinium in the nanoparticle.

FIG. 3 also shows reference traces for Pt, $Pt_2Gd/C$, $Pt_3Gd/C$. It is seen that the catalyst is mainly composed of $Pt_2Gd/C$ and $Pt_3Gd/C$ in amounts depending on the chosen reaction temperature.

FIG. 4 also includes a trace for nanoparticles produced without any nitrogen-rich organic compound in the precursor, as well as reference traces for the carbon support, metallic Pt(0), $Pt_2Gd/C$, and GdOCl. Unlike the nanoparticles formed in the presence of a nitrogen-rich organic compound, the particles formed in the absence thereof mainly consist of metallic platinum and GdOCl.

The present invention will now be described in more detail in the following.

DETAILED DESCRIPTION OF THE INVENTION

Definitions

Prior to discussing the present invention in further details, the following terms and conventions will first be defined:

Alloy Nanoparticle

In the present context, an alloy nanoparticle is a small object that behaves as a whole unit and has a diameter in the range of 0.1-100 nm. The object consist of different elements that have been melted together at high temperatures to create a material having metallic properties.

Ambient Air

In the present context, ambient air is the atmospheric air of the surroundings.

Annealing

In the present context, annealing is a heat treatment wherein the physical and sometimes chemical properties of a material is altered. Annealing is usually used to induce softness, relieve internal stresses, refine the structure and improve cold working of the material. Controlled cooling may be necessary to obtain the desired properties.

First Metal

In the present context, the "first metal", is the metal to be alloyed with a platinum group metal. This may in the broadest sense be any metal capable of alloying with platinum group metals under the conditions of the present process, and includes at least transition metals, lanthanides and alkaline earth metals. The first metal is used in salt form, where salts may also include coordination complexes of the metal with e.g. organic species.

Platinum Group Metal

In the present context, the second metal of the alloy produced is a platinum group metal. The platinum group metals are a defined group of metals in the periodic table including ruthenium (Ru), rhodium (Rh), palladium (Pd), osmium (Os), iridium (Ir), and platinum (Pt). These metals may interchangeably be named platinoids, platinides, and platidises. The platinum group metals may be in particle form, possibly as nanoparticles.

Nitrogen-Rich Compound

In the present context, a nitrogen-rich compound is a compound comprising sufficient nitrogen to facilitate the formation of nanoparticles under the conditions of the process of the present invention. A nitrogen-rich compound is typically an organic small molecule, with a high content of nitrogen, having a chemical formula with a stoichiometric ratio between carbon to nitrogen of 6:1-1:4, such as 6:1-1:2, such as 2:1-1:2, such as preferably 1:1-1:2. Alternatively the compound has a nitrogen content of more than 14%, such as more than 30%, 40%, 50% such as 60%.

Support Material

In the present context, a support material is a solid usually comprising carbon, alumina and/or silica, and to which a catalyst may be affixed. The material should have a high surface to volume ratio and exhibiting very good durability at the temperature needed to obtain the desired catalytic activity. The support may be inert or participate in the catalytic reactions.

Material Comprising a Platinum Group Metal

In the present context, the material comprising a platinum group metal may comprise platinum group metals in the ground state (oxidation state zero) and/or in higher oxidized state. The platinum group metal may be in the form of a salt, or in a coordination complex, or otherwise bonded to an organic part. The material may also comprise a support material in the form of a solid, such as e.g. carbon. The material is typically in particulate form, such as powder form. The platinum group metal may be in the form of nanoparticles.

Rare-Earth Metal (RE)

In the present context, a rare-earth metal is an element selected from the group consisting of scandium, yttrium and the 15 lanthanides.

Transition Metal

In the present context, a transition metal is scandium or yttrium, or an element selected from either of groups 4-11 in the periodic system. The entire group of transition metals in the present context consist of: scandium (Sc), titanium (Ti), vanadium (V), chromium (Cr), Manganese (Mn), iron (Fe), cobalt (Co), nickel (Ni), cobber (Cu), yttrium (Y), zirconium (Zr), niobium (Nb), molybdenum (Mo), technetium (Tc), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), gold (Au), rutherfordium (Rf), dubnium (Db), seaborgium (Sg), bohrium (Bh), hassium (Hs).

Catalyst

In the present context, a catalyst is a chemical substance that by its presence is able to increase the reaction rate of a chemical reaction without itself suffering any permanent chemical change.

Dispersion

In the present context, a dispersion is a system comprising at least two phases, wherein one phase is finely dispersed in the other. It may be phases of one material or different materials.

Inert Gas

In the present context, an inert gas consist of one or several elements or molecules that are all unreactive under the applied reaction conditions. Most commonly used inert gasses are argon, nitrogen and helium.

Gas Comprising Hydrogen

In the present context, the gas comprising hydrogen is typically not pure hydrogen, but rather an inert gas comprising a certain percentage of hydrogen therein. Thus, the gas comprising hydrogen further comprises an inert gas, such as argon, helium or nitrogen.

Salt of at Least One First Metal

In the present context, the salt of at least one metal is a compound in which the metals are oxidized with either organic and/or inorganic counter-ions and species in which the metals are in a coordination-complex. The term also include compounds in which the metal is covalently bonded to the rest of the molecule e.g. organometallic compounds.

Precursor Mixture

In the present context, a precursor mixture is a mixture comprising a salt of at least one first metal, a material comprising a platinum group metal or a material comprising gold (Au), a nitrogen-rich compound, and optionally a support material. Further materials may also be added.

The present inventors have developed a process which surprisingly allows for facile, scalable and efficient production of alloy nanoparticles of particularly platinum group metals or gold (Au) with a broad range of other metals.

The process involves mixing a salt of a first metal with a material comprising a platinum group metal or gold, and a nitrogen-rich organic compound, prior to annealing the metal salt and the platinum group metal or gold at high temperature under reductive conditions, i.e. in the presence of hydrogen gas. The process facilitates the production of efficient platinum group metal-metal or gold alloys with good catalytic efficiency, and consequently allows for a reduced use of the very expensive platinum group metals, without compromising efficiency. Particularly the presence of a nitrogen-rich compound during the process, surprisingly aids in avoiding sintering of the final alloy nanoparticles.

The Process

Thus, a first aspect of the present invention is a process for producing alloy nanoparticles comprising the steps of:
a) mixing:
   a salt of at least one first metal,
   a material comprising a platinum group metal,
   a nitrogen-rich organic compound, and
   optionally a support material,
   to provide a precursor mixture,
b) heating said precursor mixture to a temperature of at least 400° C., in the presence of a gas comprising hydrogen ($H_2$), to provide said alloy nanoparticles,
wherein the at least one first metal is selected from the group consisting of alkaline earth metals, transition metals, and lanthanides, or mixtures thereof.

However, in some embodiments the material comprising a platinum group metal may instead be a material comprising gold (Au).

The inventor surprisingly found that adding a nitrogen-rich compound to the precursor mixture prior to annealing in the presence of hydrogen resulted in a superior alloy nanoparticle product even under ambient conditions, where moisture and oxygen were not rigorously excluded from the process, by e.g. the use of glove-box conditions. Organic solvents could also be avoided, which also allows for facile scale-up of the process. Without being bound to theory it is believed that a C—N network is formed during the process due to the nitrogen-rich organic compound, which coordinates to the metals and helps distribute platinum group metal species and the first metal species.

In some embodiments of the invention the process may lead to metal oxide and other unwanted by-products, which may be removed by acid leaching. Thus, in one embodiment the process further comprises the step:
c) contacting said alloy nanoparticles with a solution comprising an acid to further purify said alloy nanoparticles.

The First Metal and Salts Thereof

The at least one first metal is selected from the group consisting of alkaline earth metals, transition metals and lanthanides, or mixtures thereof.

The alkaline earth metals may be selected from the group consisting of Beryllium (Be), Magnesium (Mg), Calcium (Ca), Strontium (Sr), Barium (Ba), and Radium (Ra). The alkaline earth metal may in particular be calcium (Ca).

The transition metals may be selected from the group consisting of scandium (Sc), titanium (Ti), vanadium (V), chromium (Cr), Manganese (Mn), iron (Fe), cobalt (Co), nickel (Ni), cobber (Cu), yttrium (Y), zirconium (Zr), niobium (Nb), molybdenum (Mo), technetium (Tc), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), gold (Au), rutherfordium (Rf), dubnium (Db), seaborgium (Sg), bohrium (Bh), and hassium (Hs). Nickel and zirconium are particularly preferred transition metals.

The lanthanides may be selected from the group consisting of Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), and Lutetium (Lu).

In a more preferred embodiment the first metal is selected from the group consisting of rare earth metals or mixtures thereof. The rare earth metal may be selected from the group consisting of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

In preferred embodiment, the first metal is selected from the group consisting of a rare earth metal, nickel (Ni), zirconium (Zr), cobber (Cu), and cobalt (Co), or a mixture thereof.

In particular preferred embodiment, the first metal is selected from the group consisting of a rare earth metal, nickel (Ni), and zirconium (Zr), or a mixture thereof.

In particular preferred embodiment, the first metal is selected from the group consisting of gadolinium, terbium, yttrium and dysprosium, or mixtures thereof.

In one embodiment the first metal is not iron (Fe), and the salt of the first metal is not a salt of iron. In a particular embodiment the proviso is included that the nitrogen-rich organic compound is not acetonitrile.

In particular the salt of the first metal may be selected from the group consisting of $GdCl_3$, $GdBr_3$, $GdI_3$, $TbCl_3$, $YCl_3$, and $NiCl_2$.

The Material Comprising a Platinum Group Metal or Gold

The material comprising a platinum group metal may be either a metal as such, possibly in particle or nanoparticle form, or a salt of the metal, or the metal mixed with a support material. Thus, in a preferred embodiment the material comprising a platinum group metal is selected from the group consisting of a platinum group metal, a salt of a platinum group metal, and nanoparticles of a platinum group metal on a support material. In some embodiments a support material may be added separately as reflected in the first aspect above, where an optional support material may be added. Hence a combination of a salt of a platinum group metal and a separately added support material may for example be used.

The second metal, which is combined in the alloy with the first metal is a platinum group metal, and may be selected from the group consisting of ruthenium (Ru), rhodium (Rh), palladium (Pd), osmium (Os), iridium (Ir), and platinum (Pt), preferably platinum (Pt), whereas the salt of a platinum group metal may selected from the group consisting of $H_2PtCl_6$, $PtCl_2$, $PtI_2$, $PtBr_2$, $Pt(C_5H_7O_2)_2$, and mixture or hydrates thereof.

The support material, whether it is added with platinum group metal particles or separately may be based on materials selected from the group consisting of carbon, alumina, silica, titanium oxide, or combinations thereof, preferably carbon. The support material may be in particle form, such as a powder. In preferred embodiments the nanoparticles of a platinum group metal on a support material comprises 1090% (w/w) platinum group metal, such as 20-80% (w/w), 30-60% (w/w), such as preferably 35-45% (w/w) platinum group metal as compared to support material.

The material comprising platinum group metal, may particularly be platinum group metal on carbon (Px/C), such as platinum on carbon (Pt/C). However, the material comprising a platinum group metal may instead be a material comprising gold (Au).

Thus, an embodiment of the present invention relates to a process, wherein the material comprising gold (Au) is selected from the group consisting of a salt of gold, and nanoparticles of gold on a support material.

The Gas Comprising Hydrogen

The gas comprising hydrogen used in step b) is typically not pure hydrogen, but rather an inert gas comprising a certain percentage of hydrogen therein. Thus in a preferred embodiment the gas comprising hydrogen further comprises an inert gas, such as preferably argon, helium or nitrogen. The gas is typically provided as a flow of gas passing through a compartment wherein step b) is performed. The gas comprising hydrogen may preferably comprise 0.1-20% (V/V) hydrogen, such as 1-10% (V/V) hydrogen, such as preferably about 5% hydrogen (V/V).

The Nitrogen-Rich Organic Compound

The nitrogen-rich compound of the present invention is a nitrogen rich organic compound. The nitrogen-rich organic compound has a chemical formula with a stoichiometric ratio between carbon to nitrogen of 6:1-1:4, such as 6:1-1:2, such as 2:1-1:2, such as 1:1-1:2, such as 1:1-1:10, such as 1:1-1:5. Alternatively the compound has a nitrogen content of more than 14%, such as more than 30%, 40%, 50% such as 60%. The percentage may be the nitrogen percentage as obtained from elemental analysis.

The compound may be a small molecule organic compound i.e. the nitrogen-rich organic compound may be an organic compound with a molar mass below 1000 g/mol, such as below 500 g/mol, such as in the range of 10-500 g/mol, 20-400 g/mol, such as preferably 20-150 g/mol. Most preferably, the nitrogen-rich organic compound is a solid at room temperature (20° C.).

In a particularly preferred embodiment the nitrogen-rich organic compound is a compound selected from the group consisting of cyanamide ($NH_2CN$), dicyandiamide (($H_2N)_2C{=}NCN$), melamine ($C_3H_6N_6$), carbon nitrides, ethylenediamine ($C_2H_8N_2$), 1,10-phenanthroline ($C_{12}H_8N_2$), histidine ($C_6H_9N_3O_2$), 2,2'-bipyridine ($C_{10}H_8N_2$), 2,5-dimethylpyrrole ($C_6H_9N$), maleimide ($C_4H_3NO_2$), imidazole ($C_3H_4N_2$), polyacrylonitrile ($C_3H_3N$), thiourea ($CH_4N_2S$). Cyanamide is most preferred.

Carbon nitrides may include beta carbon nitride, graphitic carbon nitride, azafullerenes, cyanofullerenes, cyanogens, percyanoalkynes, -alkenes and -alkanes, dicyanopolyynes, perazidoalkynes, -alkenes and -alkanes, percyanoheterocycles, and aromatic cyanocarbons.

The Alloy Nanoparticles

The alloy nanoparticles of the present invention may be provided in crude form or they may be purified further prior to use, e.g. with acid leaching and/or washing with water as further described below. This typically will depend of the initial purity of the crude alloy nanoparticles. It should be understood that when referring to alloy nanoparticles, these particles may be present in conjunction with said support material.

The alloy nanoparticles may preferably have an average particle size of 0.1-100 nm, such as 1-50 nm, such as preferably 2-40 nm, 3-20 nm, such as 3-15 nm. The alloy nanoparticle preferably have catalytic activity, particularly in an oxygen reduction reaction (ORR) of, e.g. a fuel cell. Therefore, the alloy nanoparticles are preferably a catalyst, such as a catalyst for the ORR reaction.

The alloy nanoparticles are an alloy of the first metal (M) and the second metal, which is a platinum group metal (Px) or gold (Au), and thus the alloy nanoparticles may comprise an alloy in the form of $Px_n(M)_m$, wherein n is 2, 3, 4, 5, 6, 7 8, 9 or 10 and m is 1, 2 or 3, wherein Px represents any platinum group metal, preferably platinum, and wherein M represents the first metal.

Thus, the alloy nanoparticles comprise alloy(s) formed from a first metal and a platinum group metal or formed from a first metal and gold (Au). However, the two metals forming the alloy cannot be identical. A preferred embodiment therefore includes the proviso that the first metal and the platinum group metal or gold (Au) cannot be selected such that both metals are identical.

Preferred combinations of metals in the alloy nanoparticles include Pt—Gd, Pt—Ni, Pt—Y, Pt—Tb, Pt—Pd, Au—Cu, Au—Ni, Pd—Ni, and Pd—Cu. Preferably the nanoparticles are on carbon support.

Process Steps and Further Parameters

The process of the present invention comprises two primary steps [step a) and step b)] and optionally a third step c) to further purify the resulting alloy nanoparticles. Step a) involves the mixing of the two metals (or precursors thereof), eventually forming the alloy, with a nitrogen-rich organic compound and optionally a support material to form a precursor mixture. Step b) is an annealing step, which involves the heating of the precursor mixture under a reductive atmosphere in the form of a gas comprising hydrogen. Finally, the optional step c) is an acid leaching step, which involves contacting the resulting alloy nanoparticles (optionally on a solid support) with an acid typically in solution (dilute acid). It is important to note that the method of the present invention may comprise additional steps before step a), in between step a) and step b), in between step b) and step c) and finally also after step c). Thus, further details regarding steps a), b) and c) and additional steps of the present invention are described in the following.

The amount of platinum group metal in the precursor mixture may preferably comprise the platinum group metal in amounts such as 1-20% by weight, 1-15% by weight, such as 1-10% by weight, such as preferably 1-8% by weight. Further, the precursor mixture may preferably comprise said nitrogen-rich organic compound in an amount of 20-90% by weight, such as 40-80% by weight, 50-70% by weight, such as preferably 60-70% by weight. At the optimum amounts of nitrogen-rich organic compound the alloy nanoparticles are formed in optimum size distributions with high catalytic activity, even if the oxygen and moisture is not rigorously excluded from the process, particularly step a) of the process.

Hence, in a preferred embodiment the mixing of step a) is performed in ambient air. Preferably, the mixing of step a) is not performed in a glove box.

The process of forming the alloy nanoparticles involves the heating of the precursor mixture and the annealing of the involved metals. Thus, in a preferred embodiment the heating of the precursor of step b) is performed at a temperature of 400-1000° C., such as 450-1000° C., 500-1000° C., such as preferably 500-800° C.

The duration of the heating of step b) may vary according to temperature and the metals to be alloyed, hence the heating of the precursor of step b) may performed for a duration of 5 mins-5 hours, such as 0.1-5 hours, such as preferably 0.5-2 hours.

The reductive environment needed to reduce the salt of the first metal to metal per se is provided by the gas comprising hydrogen. The gas comprising hydrogen ($H_2$) is preferably provided by means of a flow of a gas, which may be applied at a flowrate of 0.1-20.0 ml/min, such as 0.5-10.0 ml/min, such as preferably 2-7 ml/min.

Step b) is preferably performed in a closed compartment, which is preferably adapted to provide a flow of gas through the compartment. Thus, the heating of the precursor of step b) may preferably be performed using a furnace, such as by inserting a closed compartment providing for said gas flow in said furnace. The closed compartment may preferably be a quartz tube adapted for said furnace and adapted to provide for said gas flow. The precursor mixture may be positioned in the closed compartment in an open container, such as a bowl or boat shaped container, preferably a quartz boat.

The process of the present invention may optionally provide for an acid leaching step (step c), which aids in removing metal oxide impurities from the final alloy nanoparticles, if such are present. In a preferred embodiment the acid of step c) is an inorganic acid, such as preferably an inorganic acid selected from the group consisting of sulphuric acid ($H_2SO_4$), hydrochloric acid (HCl), hydrofluoric acid (HF), nitric acid ($HNO_3$) and phosphoric acid ($H_3PO_4$), preferably sulphuric acid ($H_2SO_4$). The acid may preferably be in solution and the solution may preferably comprise the acid in an aqueous solution, preferably at a concentration of 0.1-2.0 M, such as 0.1-1.5 M, such as preferably 0.1-1.0 M. Preferably, the alloy nanoparticles of step c) are contacted with the acid at a temperature such as 20-100° C., 40-100° C., such as preferably 70-90° C. Further the acid may preferably be contacted with the acid or acid solution for a duration of 10-120 min, such as 30-120 min, 60-120 min, such as preferably 90-120 min.

The alloy nanoparticles provided in step b) or c) may further be washed with water, preferably purified water, including e.g. demineralized water and milliQ water or equivalents. The alloy nanoparticles provided in c) and/or after washing may preferably be dried, preferably at a temperature such as 20-110° C., 50-110° C., such as preferably 80-110° C.

In some embodiments of the present invention it may be advantageous to perform an additional heating step after providing the alloy nanoparticles provided. Such an additional heating step may reduce porosity of the alloy nanoparticles. Therefore in a preferred embodiment the alloy nanoparticles provided in step b) or c) are subjected to an additional annealing step at a temperature of at least 400° C., preferably without the presence of hydrogen ($H_2$). The temperature may preferably be 400-800° C., such as 500-700° C.

Some particular preferred embodiments of the present invention includes:

A particular embodiment of the invention relates to a process for producing alloy nanoparticles comprising the steps of:
a) mixing:
a salt of at least one rare earth metal,
a material comprising a platinum group metal or a material comprising gold (Au),
a nitrogen-rich organic compound, and
optionally a support material,
to provide a precursor mixture,
b) heating said precursor mixture to a temperature of at least 400° C., in the presence of a gas comprising hydrogen ($H_2$), to provide said alloy nanoparticles,
wherein the nitrogen-rich organic compound has a chemical formula with a stoichiometric ratio between carbon to nitrogen of 6:1-1:4.

A particular embodiment of the invention relates to a process for producing alloy nanoparticles comprising the steps of:
a) mixing:
a salt of at least one rare earth metal,
a material comprising a platinum group metal or a material comprising gold (Au),
a nitrogen-rich organic compound, and
optionally a support material,
to provide a precursor mixture,
b) heating said precursor mixture to a temperature of at least 400° C., in the presence of a gas comprising hydrogen ($H_2$), to provide said alloy nanoparticles,
wherein said nitrogen-rich organic compound is selected from the group consisting of cyanamide ($NH_2CN$), dicyandiamide (($H_2N)_2C=NCN$), melamine ($C_3H_6N_6$), carbon nitrides, ethylenediamine ($C_2H_8N_2$), 1,10-phenanthroline ($C_{12}H_8N_2$), histidine ($C_6H_9N_3O_2$), 2,2'-bipyridine ($C_{10}H_8N_2$), 2,5-dimethylpyrrole ($C_6H_9N$), maleimide ($C_4H_3NO_2$), imidazole ($C_3H_4N_2$), polyacrylonitrile ($C_3H_3N$), and thiourea ($CH_4N_2S$).

Another particular embodiment of the invention relates to a process for producing alloy nanoparticles comprising the steps of:
a) mixing:
a salt of at least one first metal selected from the group consisting of alkaline earth metals, transition metals, and lanthanides, or mixtures thereof,
a material comprising platinum group metal particles, or a material comprising gold (Au) particles
a nitrogen-rich organic compound, and
optionally a support material,
to provide a precursor mixture,
b) heating said precursor mixture to a temperature of at least 400° C., in the presence of a gas comprising hydrogen ($H_2$), to provide said alloy nanoparticles,
wherein the nitrogen-rich organic compound has a chemical formula with a stoichiometric ratio between carbon to nitrogen of 6:1-1:4.

Yet another particular embodiment of the invention relates to a process for producing alloy nanoparticles comprising the steps of:
a) mixing:
a salt of at least one first metal selected from the group consisting of a rare earth metal, nickel (Ni), and zirconium (Zr), or a mixtures thereof,
a material comprising a platinum group metal,
a nitrogen-rich organic compound, and
optionally a support material,
to provide a precursor mixture,
b) heating said precursor mixture to a temperature of at least 400° C., in the presence of a gas comprising hydrogen ($H_2$), to provide said alloy nanoparticles
wherein said nitrogen-rich organic compound is selected from the group consisting of cyanamide ($NH_2CN$), dicyandiamide (($H_2N)_2C=NCN$), melamine ($C_3H_6N_6$), carbon nitrides, ethylenediamine ($C_2H_8N_2$), 1,10-phenanthroline ($C_{12}H_8N_2$), histidine ($C_6H_9N_3O_2$), 2,2'-bipyridine ($C_{10}H_8N_2$), 2,5-dimethylpyrrole ($C_6H_9N$), maleimide ($C_4H_3NO_2$), imidazole ($C_3H_4N_2$), polyacrylonitrile ($C_3H_3N$), and thiourea ($CH_4N_2S$).

In a particularly preferred embodiment the alloy nanoparticles of the present invention are for use in a proton exchange membrane fuel cell (PEMFC), or an electrolyzer cell.

As mentioned the present invention allows for relaxation of the requirement of oxygen and moisture free environments, and thus a preferred process of the invention is a process wherein no steps of the process are performed in a glove box.

A second aspect of the present invention relates to an alloy nanoparticle obtainable by the process according to the first aspect of the present invention.

A third aspect of the present invention relates to an alloy nanoparticle obtained by the process according to the first aspect of the present invention.

A fourth aspect of the present invention relates to a proton exchange membrane fuel cell (PEMFC) or an electrolyzer cell comprising alloy nanoparticles according the second or third aspect of the present invention.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Materials

All the chemical compounds used for preparation of the precursor were brought from Sigma-Aldrich. The compounds are: chloroplatinic acid hexahydrate ($H_2PtCl_6·6H_2O$), gadolinum(III)chloride ($GdCl_3$, 99.99% trace metal basis), cyanamide ($CN_2H_2$, 99%) and graphitized mesoporous carbon black (<500 nm particle size). The $H_2$/Ar gas was brought from AGA (VARIGON® H5 from AGA, $H_2O \leq 20$ ppm, $O_2 \leq 20$ ppm, equipped with a $O_2$ trap (Superpure®-O, Sigma-Aldrich) and a moisture trap (Molecular Sieve 5A, Sigma-Aldrich)). The gas can also be manually mixed gas from Ar (AGA, purity: 5.0) and H2 (AGA, purity: 5.0) without the need to use any O2 and moisture trap.

A commercial Pt/C catalyst (JM Pt/C, 20 wt % Pt, Johnson Matthey) was brought and used as a reference to evaluate the ORR catalytic activity of the produced $Pt_xGd$/C nanoparticles.

Instrumentation

Powder X-ray diffraction (XRD) measurements were performed with a MiniFlex 600 X-ray diffractometer (Rigaku) using a Cu $K_\alpha$($\lambda$=1.5418 Å) radiation source.

Transmission electron microscope (TEM) and high-angle annular dark-field scanning transmission electron microscopy (HAADF-STEM) were obtained with an FEI Titan Analytical 80-300ST TEM equipped with a spherical aberration corrector and a X-Max TLE Energy Dispersive X-Ray Spectroscopy (EDS) detector at 300 kV.

A Biologic VSP multichannel potentiostat with a rotating disk electrode (RDE, 0.196 cm², Pine Research Instrumentation) was used to test the catalyst activities towards the oxygen reduction reaction (ORR). A standard three-electrode cell was employed for the measurements, which incorporated RDE as the working electrode, a graphite rod (99.995% trace metals basis) as the counter electrode and a daily prepared and calibrated reference hydrogen electrode (RHE) as the reference electrode.

Example 1

Preparation of $Pt_xGd$/C Nanoparticles

Preparation of the precursor was done by mixing 0.224 g of $H_2PtCl_6·6H_2O$, 0.196 g of $GdCl_3$, 1.806 g of $CN_2H_2$ and 0.336 g of graphitized mesoporous carbon black. The mixture was ground with a mortar and pestle to create a fine powder. The precursor was then transferred into a quartz boat which was placed in a quartz-tube furnace. The furnace was evacuated and purged with 5% $H_2$/Ar. The furnace was then heated from room temperature to 700° C. at the rate of 10° C. min$^{-1}$ and stayed at 700° C. for 2 h, after which it was cooled down to room temperature at the rate of around 25° C. min$^{-1}$. Cyanamide ($CN_2H_2$) can be replaced by melamine ($C_3H_6N_6$) in the preparation, which yielded the same product of PtxGd nanoparticles with similar particle sizes.

Example 2

Preparation of $Pt_xGd$/C Nanoparticles

Preparation of the precursor was done by mixing 0.224 g of $H_2PtCl_6·6H_2O$, 0.196 g of $GdCl_3$, 1.806 g of $CN_2H_2$ and 0.336 g of graphitized mesoporous carbon black. The mixture was ground with a mortar and pestle to create a fine powder. The precursor was then transferred into a quartz boat which was placed in a quartz-tube furnace. The furnace was evacuated and purged with 5% $H_2$/Ar. The furnace was then heated from room temperature to 700° C. at the rate of 10° C. min$^{-1}$ and stayed at 700° C. for 2 h, after which it was cooled down to room temperature at the rate of around 25° C. min$^{-1}$. The nanoparticles were then leached in 1.0 M $H_2SO_4$ with stirring at 80° C. for 2 h, thoroughly washed with hot Milli-Q water, and then vacuum-dried at 80° C. for 6 h.

Example 3

Characterization of the $Pt_xGd$/C Nanoparticles

Figure 1:
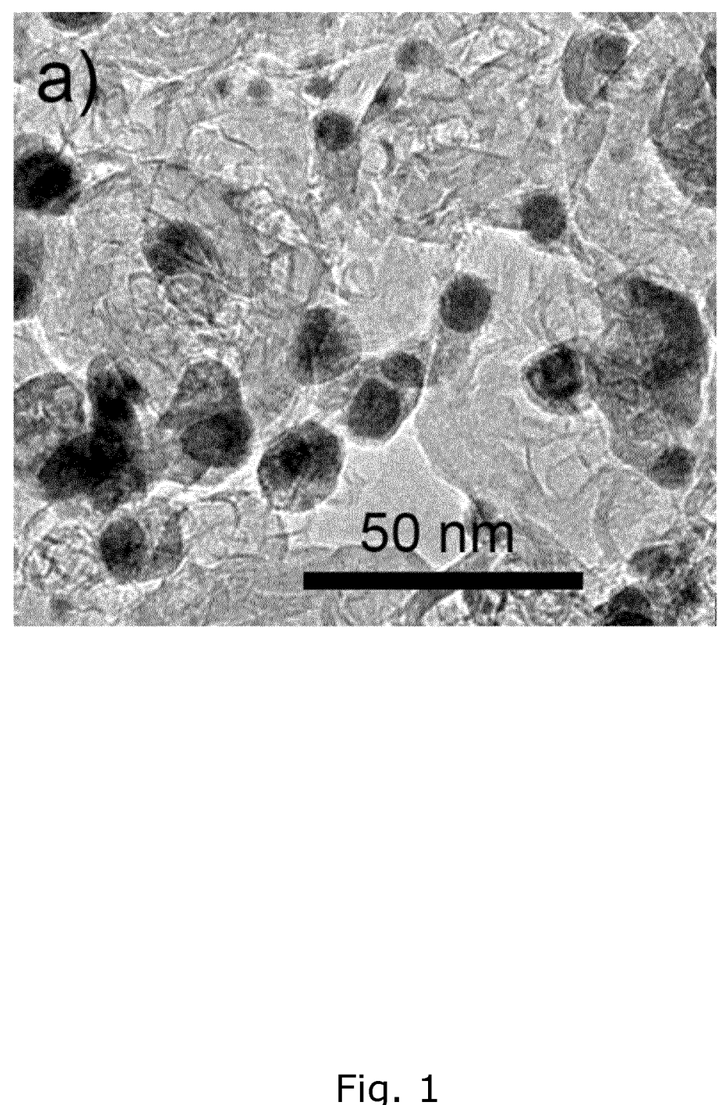
FIG. 1, shows a TEM image of a sample of $Pt_xGd/C$ nanoparticles prepared according to the procedure described in example 1.
Figure 2:
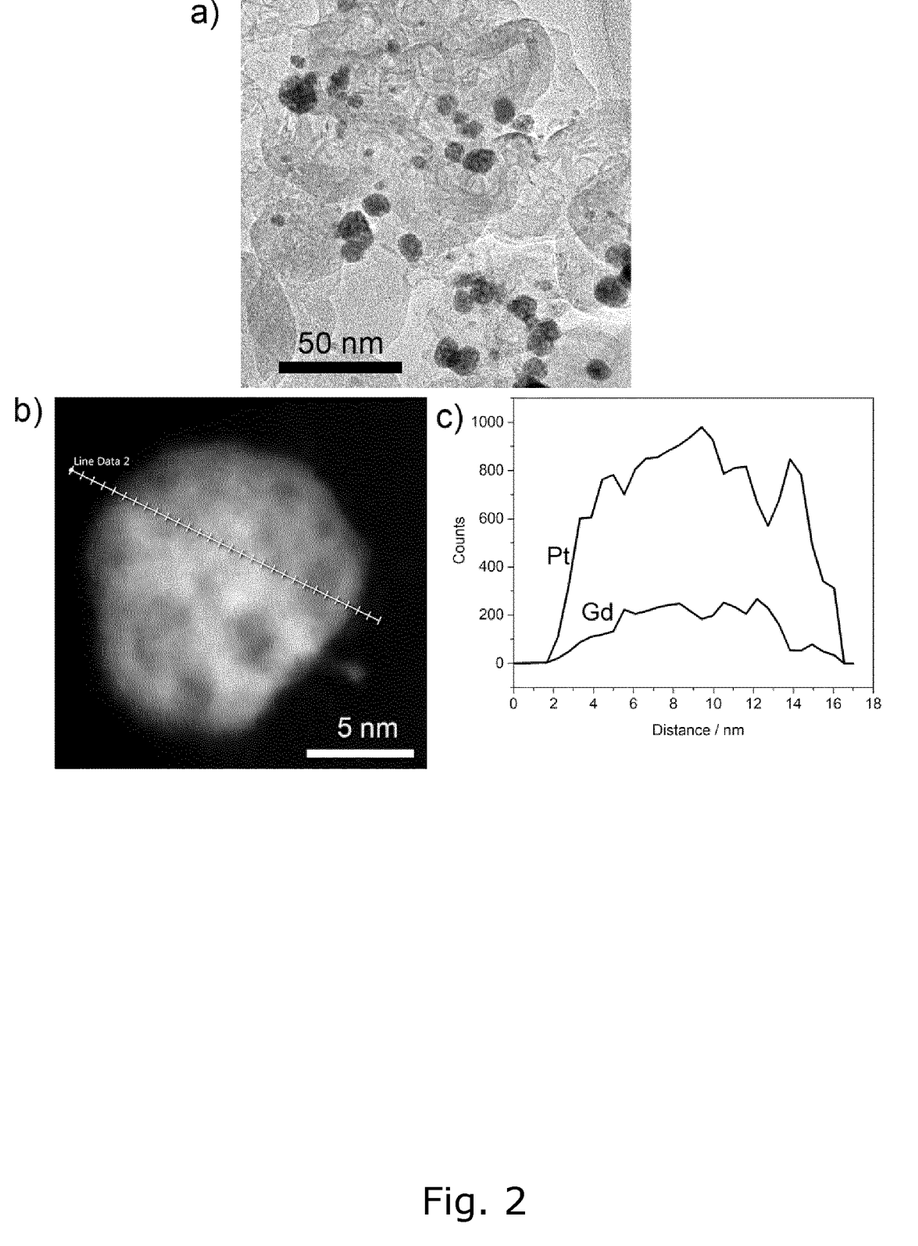

The size of the produced $Pt_xGd$/C nanoparticles is an important parameter when creating a catalyst as smaller particles have a higher surface-to-volume ratio and as the catalytic activity usually depends on the surface area. A transmission electron microscope (TEM) image of the $Pt_xGd$/C nanoparticles produced according to example 1, is depicted in FIG. 1. The image confirms that the size-range of the particles is within 3-15 nm. Another TEM image of $Pt_xGd$/C nanoparticles produced according to example 2, is depicted in FIG. 2a) and shows nanoparticles in the same size-range. A typical nanoparticle in FIG. 2a) was selected and a HAADF-STEM image taken, which is depicted in FIG. 2b). The content of platinum and gadolinium in the selected nanoparticle was measured along the line in FIG. 2b) using EDS. The resulting EDS line profile is illustrated in FIG. 2c) and shows the presence and distribution patterns of platinum and gadolinium atoms in the selected $Pt_xGd$/C nanoparticle.

Figure 3:
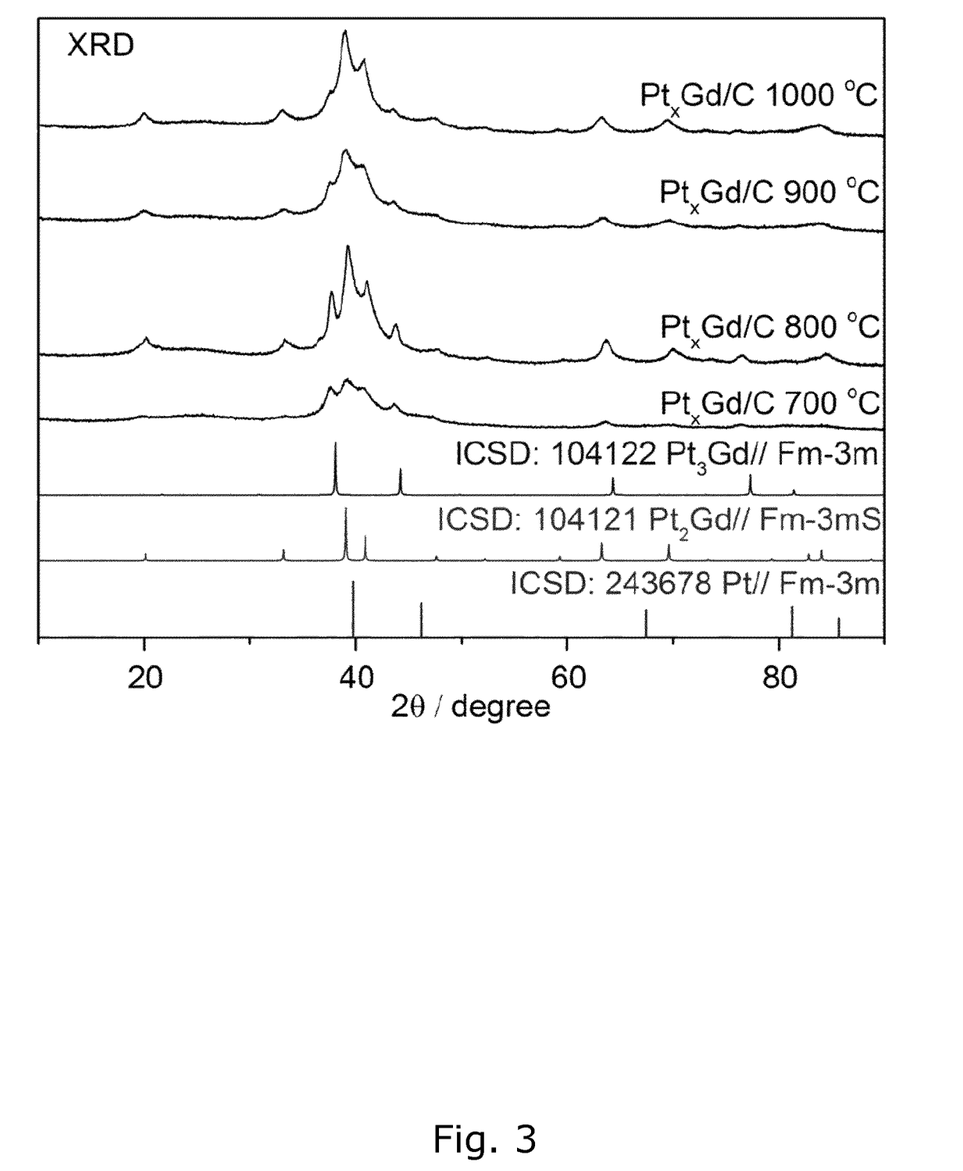
FIG. 3, shows X-ray diffraction traces of $Pt_xGd/C$ nanoparticles produced according to example 2, except that the heat treatments were performed at temperatures ranging from 700-1000° C.

Further information about the chemical composition of the $Pt_xGd$/C nanoparticles has been obtained using X-ray diffraction. An X-ray source is directed onto the sample of nanoparticles. The intensity of the scattered X-ray is recorded as the sample and the detector is rotated, hence the angle of 2θ. The exact scattering of the X-ray beam is depending on the crystal structure within the sample material. The black line in FIG. 3, is the recorded intensity of the X-ray beam as it is scattered by the $Pt_xGd/C$ nanoparticles. The reference spectre for pure metallic platinum, $Pt_2Gd$, and $Pt_3Gd$ make it possible to collate the peaks on the black line with the signals obtained for each of the references, thus to determine the composition of the nanoparticles. The XRD-spectrum in FIG. 3 shows X-ray traces for $Pt_xGd/C$ nanoparticles produced at different temperatures, as well as reference traces. The figure reveals that the nanoparticles consist of the two alloys $Pt_3Gd$ and $Pt_2Gd$.

Example 4

Effect of Adding Nitrogen-Rich Organic Compound

Preparation of the precursor without adding any nitrogen-rich organic compound was done by mixing 0.224 g of $H_2PtCl_6·6H_2O$, 0.196 g of $GdCl_3$ and 0.336 g of graphitized mesoporous carbon black. The mixture was ground with a mortar and pestle to create a fine powder. The precursor was then transferred into a quartz boat, which was placed in a quartz-tube furnace. The furnace was evacuated and purged with 5% $H_2$/Ar. The furnace was then heated from room temperature to 700° C. at the rate of 10° C. $min^{-1}$ and stayed at 700° C. for 2 h, after which it was cooled down to room temperature at the rate of around 25° C. $min^{-1}$.

Figure 4:
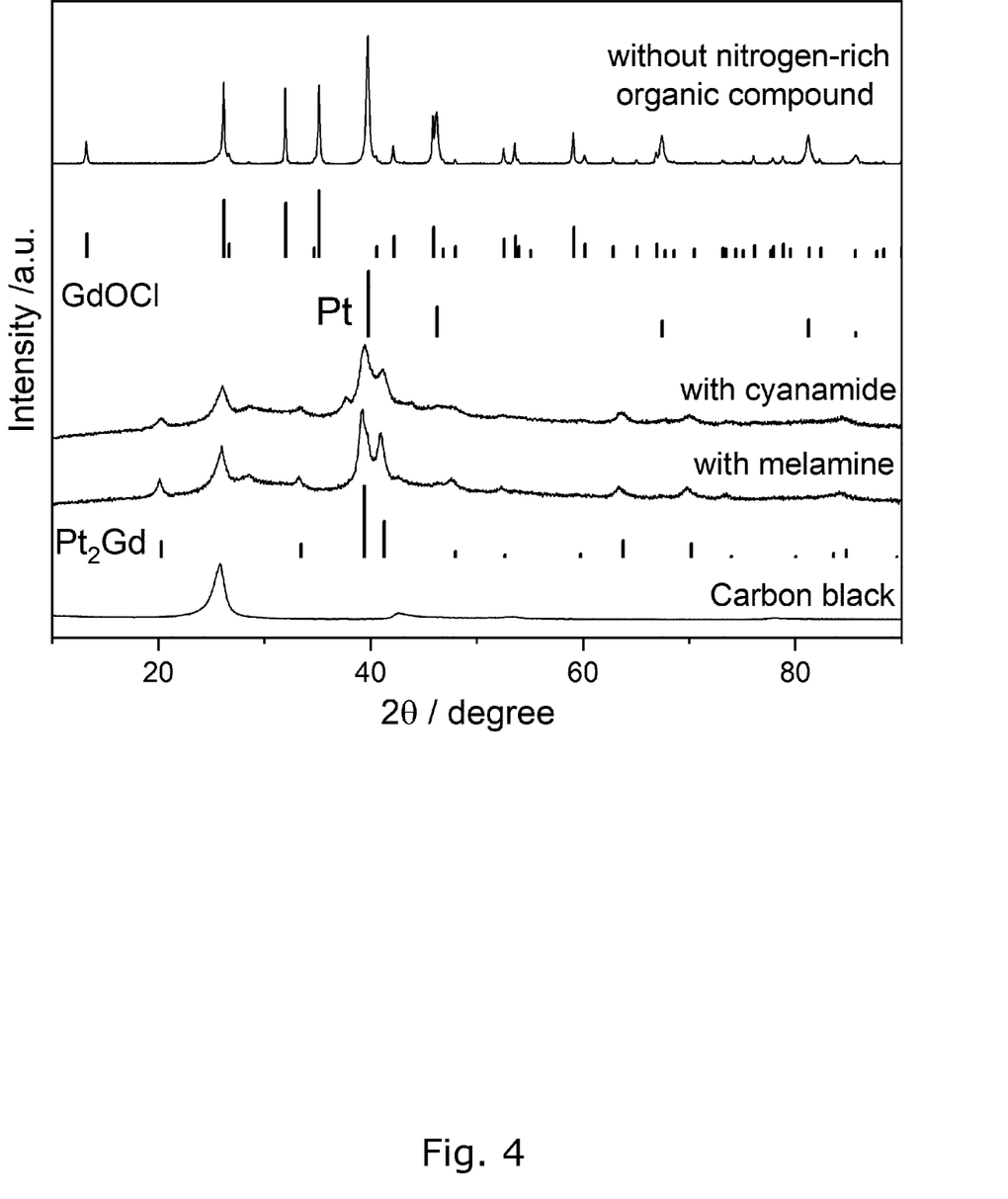
FIG. 4, shows X-ray diffraction traces of nanoparticles produced as described in example 1 with either cyanamide or melamine in the precursor.

X-ray diffraction traces for the product produced in the absence of any nitrogen-rich organic compound, and in the presence of cyanamide or melamine are depicted in FIG. 4, with reference peaks for GdOCl, metallic platinum, $Pt_2Gd$, and a trace recorded on the pure carbon support. The X-ray diffraction reveals that the nanoparticles produced in the absence of a nitrogen-rich organic compound mainly consist of GdOCl and metallic platinum, whereas the particles produced according to example 1 mainly consist of $Pt_2Gd$. The particle sizes for the $Pt_2Gd$ alloys produced from the melamine or the cyanamide are similar, indicated by the similar full width at half maximum (FWHM) of the XRD peaks. These results clearly show the importance of adding a nitrogen-rich organic compound to the precursor to be able to produce the catalytically active $Pt_xGd$ species.

Example 5

$Pt_xGd/C$ Nanoparticle as ORR Catalysts

Electrochemical measurements were conducted using a potentiostat. The electrolyte was a 0.1 M $HClO_4$ solution, which was prepared by diluting high-purity 70% $HClO_4$ (Suprapur®, Merck) with Milli-Q water (≥18.2 MΩ cm). Catalyst inks of $Pt_xGd/C$ as produced according to method 2 (17.43 wt % Pt) or a commercial Pt/C catalyst (JM Pt/C, Johnson Matthey catalyst with 20 wt % Pt) were prepared by dispersing 5.7 mg of the $Pt_xGd/C$ or 5 mg Pt/C in a mixture of 3300 μL formic acid (≥95%), 40 μL Nafion solution (5 wt %) and 40 μL Milli-Q water. The ionomer to carbon mass ratio was around 1:2. The ink was treated with sonication for about 1 hour to become uniform dispersion, after which 10 μL of the ink was cast onto a rotating disk electrode (RDE) with the catalyst loading of 15 μg Pt $cm^{-2}$ for each catalyst. All ORR curves have been corrected for the capacitance current and the solution resistance, with the latter being measured by electrochemical impedance spectroscopy (EIS).

Figure 5:
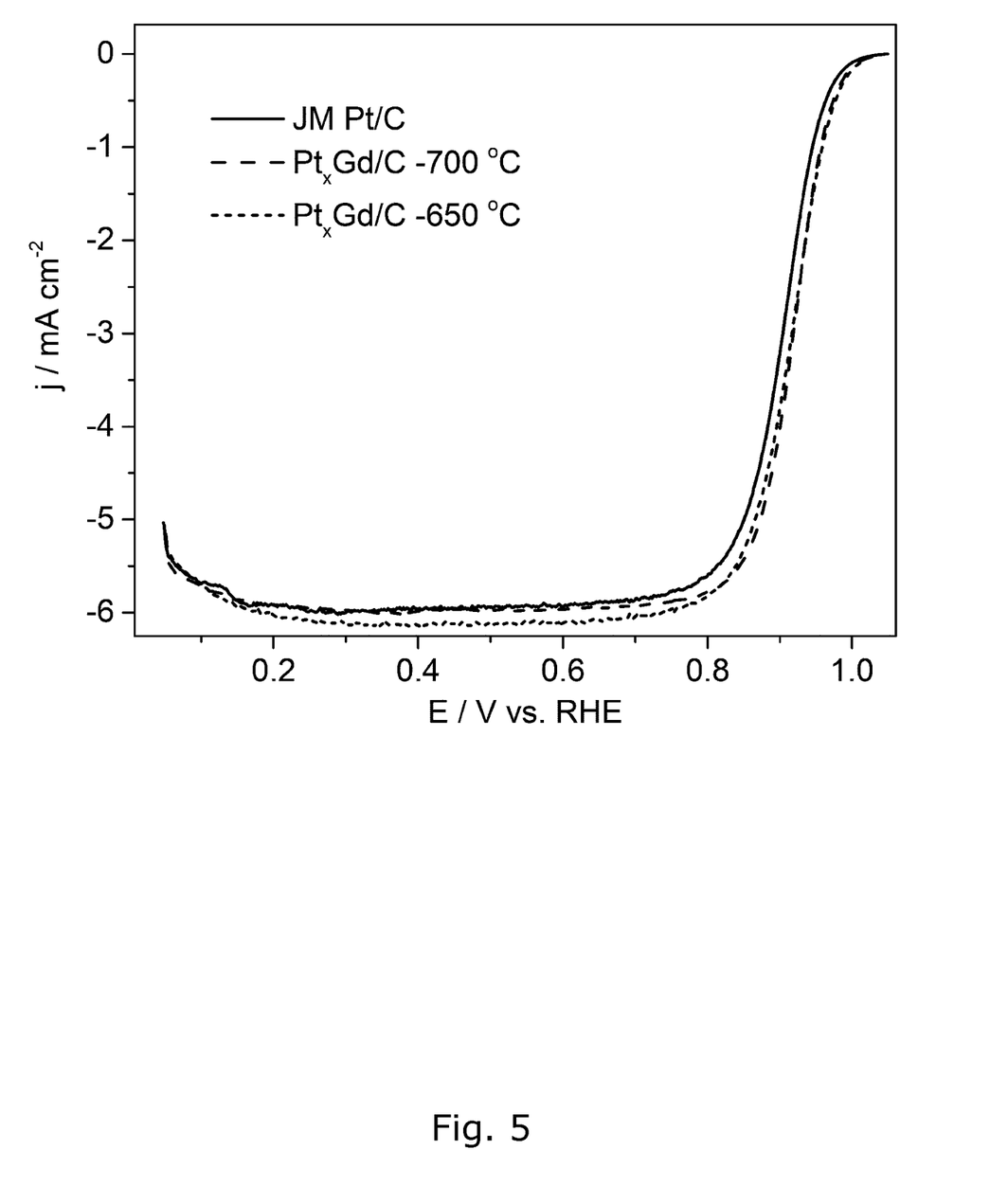
FIG. 5, shows rotating disk electrode (RDE) measurements on $Pt_xGd/C$ catalysts prepared at 650° C. and 700° C. according to example 2, and for a commercial JM Pt/C catalyst. Both of the prepared $Pt_xGd/C$ catalysts depict higher ORR onset potentials, as well as bigger ORR currents than the commercial JM Pt/C catalyst.

FIG. 5 shows the ORR curves for $Pt_xGd/C$ produced at 650° C. or 700° C., as well as for the commercial JM Pt/C catalyst. The experiment was conducted in 0.1 M $HClO_4$ at room temperature and with scan-rates of 10 mV $s^{-1}$, at rotation speeds of 1600 rpm. As shown in FIG. 5, the $Pt_xGd/C$ catalysts depict higher ORR onset potentials and bigger ORR currents than the commercial catalyst. Using the widely accepted comparison benchmark, i.e., the kinetic ORR current at 0.9 V vs. RHE, the $Pt_xGd/C$ catalyst shows two times higher mass-specific activity than the commercial one, even though the electrochemical active surface area of PtxGd/C (particle size of around 10 nm) is only half of that for JM Pt/C catalysts (particle size of around 3 nm).

Figure 6:
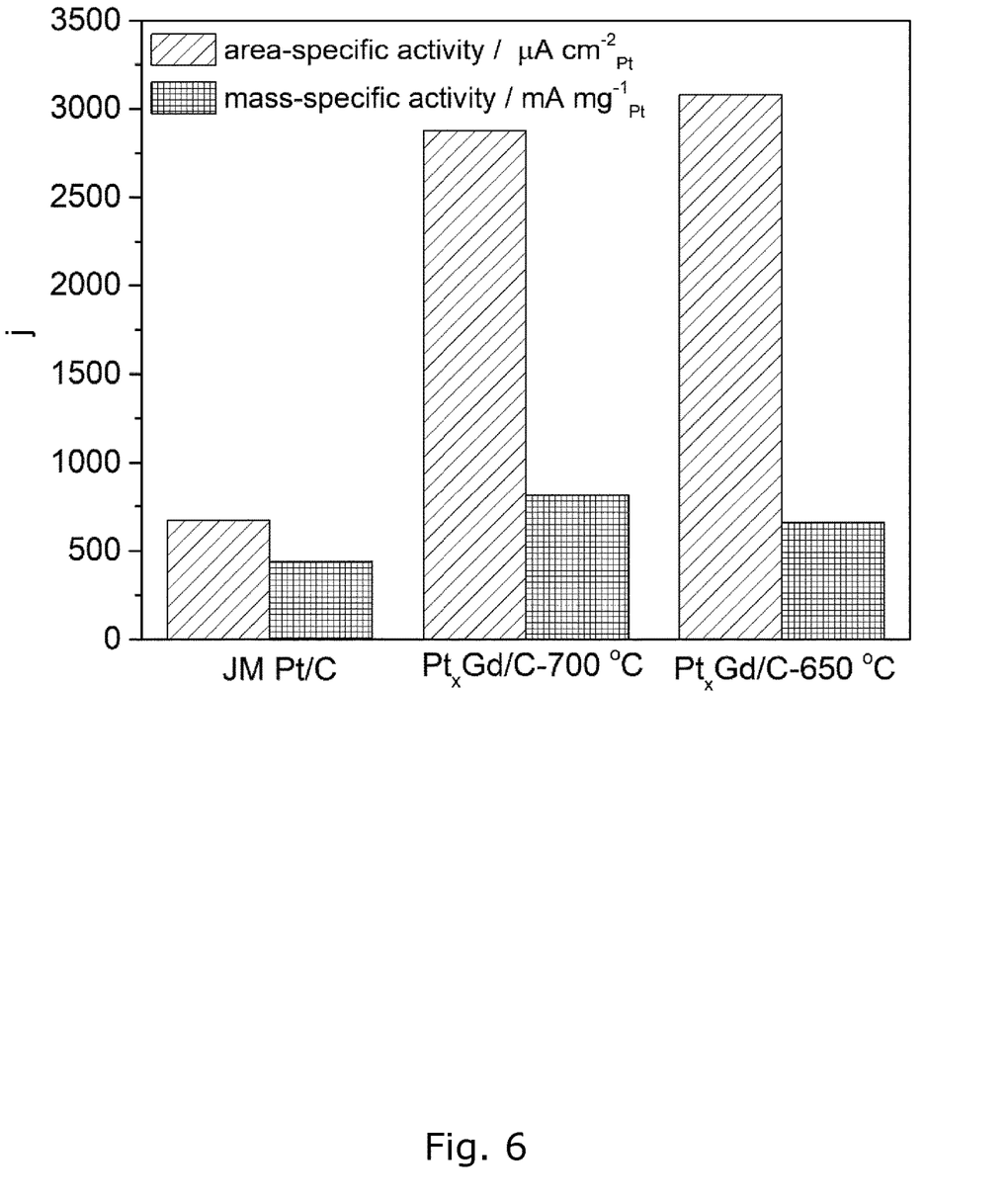
FIG. 6, shows a bar graph of the area-specific activity and mass-specific activity of $Pt_xGd/C$ catalysts produced at 650° C. or 700° C., and of commercial JM Pt/C catalyst. It is seen that $Pt_xGd/C$ nanoparticles produced at both temperatures have a much higher (about five times) ORR area-specific activity, and moderately higher (about two times) ORR mass-specific activity, than the commercial JM Pt/C catalyst.

FIG. 6 shows bar graphs of the area specific activity (μA $cm^{-2}$) and mass-specific activity (mA $mg^{-1}$) of the $Pt_xGd/C$ nanoparticles produced at 650° C. or 700° C., and of the commercial JM Pt/C catalyst. It is seen that $Pt_xGd/C$ nanoparticles have much better ORR performances than the commercial JM Pt/C catalyst, in mass-specific activity and especially in area-specific activity, as measured by rotating disc measurement described above.

Example 6

Preparation and Characterization of $Pt_xTb/C$, $Pt_xY/C$ and $Pt_xNi/C$ Nanoparticles Preparation of these three alloy nanoparticles is the same as that for Example 1, except that $GdCl_3$ is replaced with $TbCl_3·6H_2O$, $YCl_3·6H_2O$, and $NiCl_2$, respectively, and $H_2PtCl_6·6H_2O$ is replaced with $PtCl_2$ in the syntheses of $Pt_xY/C$ and $Pt_xTb/C$.

Figure 7:
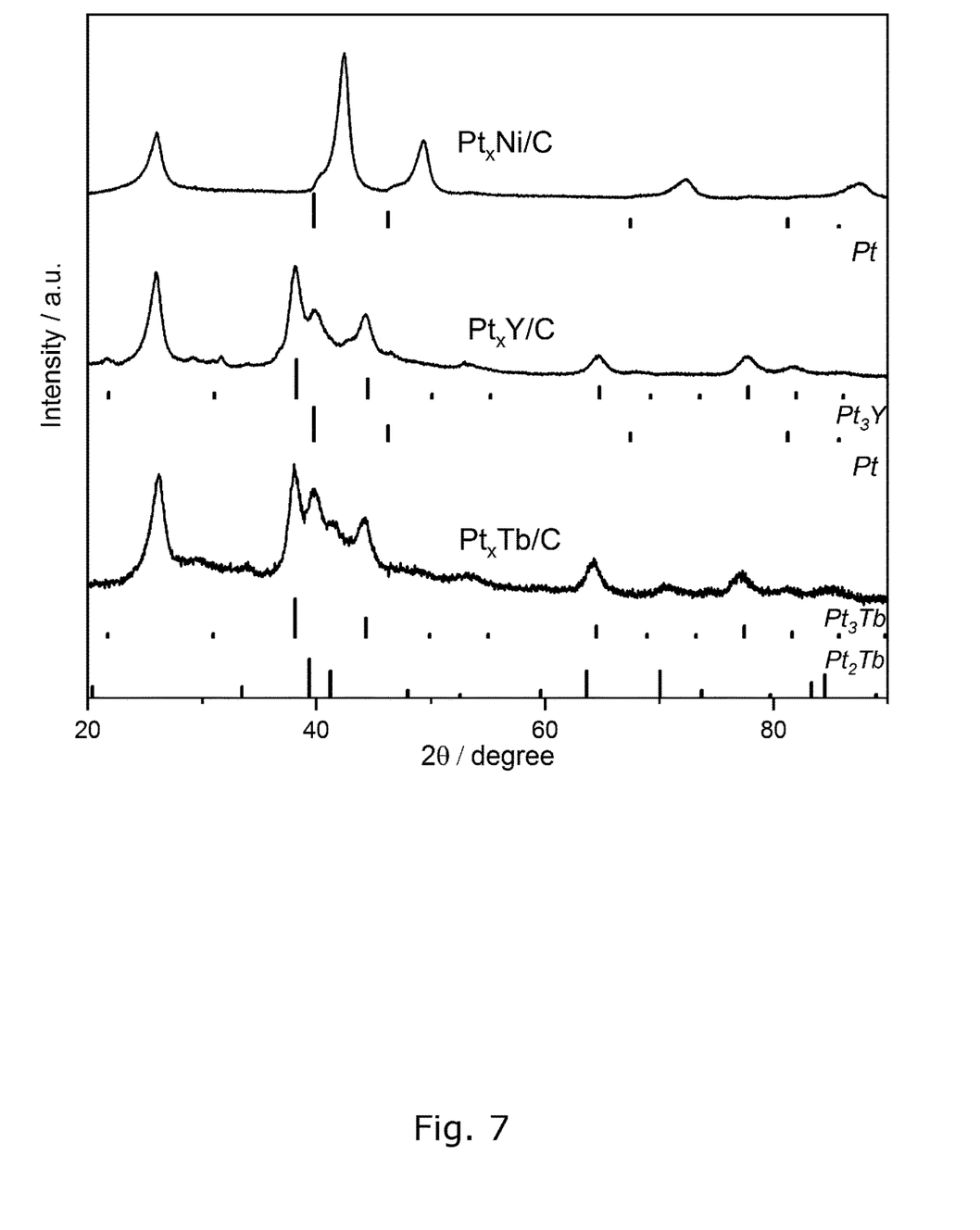
FIG. 7, shows X-ray diffraction traces of $Pt_xTb/C$, $Pt_xY/C$, and $Pt_xNi/C$ nanoparticles together with the reference patterns retrieved from the database.

FIG. 7 shows XRD patterns of these three samples together with the reference patterns retrieved from the database. It can be seen that the $Pt_xTb/C$ comprises mainly $Pt_2Tb$ and $Pt_3Tb$, $Pt_xY/C$ comprises mainly $Pt_3Y$ and a small portion of metallic Pt, and $Pt_xNi/C$ comprises mainly solid PtNi alloy and a small portion of metallic Pt.

Example 7

Preparation and Characterization of $Pd_xPt/C$, $Pd_xNi/C$, $Pd_xCu/C$, $Au_xCu/C$, and $Au_xNi$ Nanoparticles Preparation of these alloy nanoparticles is the same as that for Example 1, except that the metal salts are $PdCl_2$ and $PtCl_2$ for $Pd_xPt/C$, $PdCl_2$ and $NiCl_2$ for $Pd_xNi/C$, $PdCl_2$ and $CuCl_2$ for $Pd_xCu/C$, $AuCl_3$ and $CuCl_2$ for $Au_xCu/C$, and $AuCl_2$ and $NiCl_2$ for $Au_xNi/C$.

Figure 8:
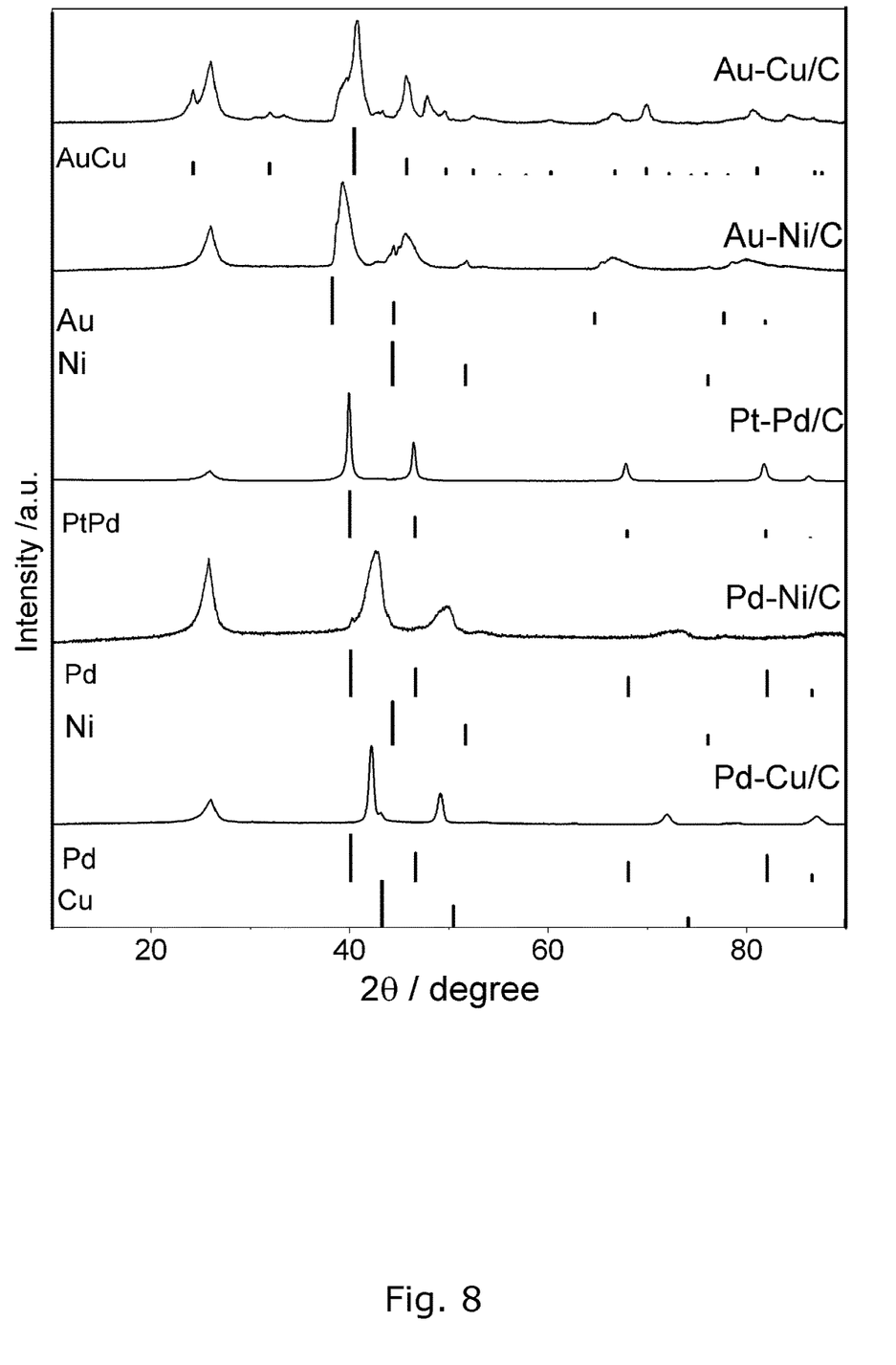
FIG. 8, shows X-ray diffraction traces of Pd—Ni/C, Pd—Cu/C, Pt—Pd/C Au—Cu/C, and Au—Ni/C, together with the reference patterns retrieved from the database.

FIG. 8 shows XRD patterns of the Au—Cu/C, Au—Ni/C, Pt—Pd/C, Pd—Ni/C, and Pd—Cu/C samples together with the reference patterns retrieved from the database.

REFERENCES

J. S. Kanady et al., J. Am. Chem. Soc., 2017, 139, 5672-5675

C. Roy et al., ACS Catal., 2018, 8, 2071-2080

WO 2017/191126

Y. Hu et al., J. Mater. Chem. A, 2015, 3, 1752-1760

Y. Hu et al., Chem Cat Chem, 2016, 8, 3131-3136

The invention claimed is:

1. A process for producing alloy nanoparticles comprising:
   a) mixing:
      a salt of at least one first metal selected from the group consisting of alkaline earth metals, transition metals, and lanthanides, or mixtures thereof,
      a material comprising gold (Au),
      a nitrogen-rich organic compound, and
      a support material,
      to provide a precursor mixture,
   b) heating said precursor mixture to a temperature of at least 400° C., in the presence of a gas comprising hydrogen ($H_2$), to provide said alloy nanoparticles,
   wherein the nitrogen-rich organic compound has a chemical formula with a stoichiometric ratio between carbon to nitrogen of 6:1-1:4 and,
   wherein the material comprising gold (Au) is selected from the group consisting of a salt of gold, and nanoparticles of gold on the support material.

2. The process according to claim 1, wherein the process further comprises:
   c) contacting said alloy nanoparticles with a solution comprising an acid to further purify said alloy nanoparticles.

3. The process according to claim 2, wherein the acid of step c) is an inorganic acid.

4. The process according to claim 3, wherein the inorganic acid is selected from the group consisting of sulphuric acid ($H_2SO_4$), hydrochloric acid (HCl), hydrofluoric acid (HF), nitric acid ($HNO_3$) and phosphoric acid ($H_3PO_4$).

5. The process according to claim 1, wherein the at least one first metal is selected from the group consisting of a rare earth metal, nickel (Ni), zirconium (Zr), copper (Cu) and cobalt (Co), or a mixture thereof.

6. The process according to claim 5, wherein the rare earth metal is selected from the group consisting of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

7. The process according to claim 1, wherein the salt of at least one first metal is selected from the group consisting of $GdCl_3$, $GdBr_3$, $GdI_3$, $TbCl_3$, $YCl_3$, and $NiCl_2$, or a mixtures thereof.

8. The process according to claim 1, wherein the support material is based on materials selected from the group consisting of carbon, alumina, silica, and titanium oxide, or combinations thereof.

9. The process according to claim 1, wherein the nitrogen-rich organic compound has a chemical formula with a stoichiometric ratio between carbon to nitrogen of 2:1-1:2.

10. The process according to claim 1, wherein the nitrogen-rich organic compound is a compound selected from the group consisting of cyanamide ($NH_2CN$), dicyandiamide (($H_2N)_2C=NCN$), melamine ($C_3H_6N_6$), carbon nitrides, ethylenediamine ($C_2H_8N_2$), 1,10-phenanthroline ($C_{12}H_8N_2$), histidine ($C_6H_9N_3O_2$), 2,2'-bipyridine ($C_{10}H_8N_2$), 2,5-dimethylpyrrole ($C_6H_9N$), maleimide ($C_4H_3NO_2$), imidazole ($C_3H_4N_2$), polyacrylonitrile ($C_3H_3N$), and thiourea ($CH_4N_2S$).

11. The process according to claim 1, wherein the heating of the precursor of step b) is performed at a temperature of 400-1000° C.

12. The process according to claim 1, wherein the salt of at least one first metal is a halogen salt.

13. The process according to claim 1, wherein the process is performed in the absence of an organic solvent.

14. A process for producing alloy nanoparticles comprising:
   a) mixing:
      a salt of at least one first metal selected from the group consisting of alkaline earth metals, transition metals, and lanthanides, or mixtures thereof,
      a material comprising a platinum group metal selected from the group consisting of ruthenium (Ru), rhodium (Rh), palladium (Pd), Osmium (Os), iridium (Ir) and platinum (Pt), or a material comprising gold (Au),
      a nitrogen-rich organic compound, and
      a support material,
      to provide a precursor mixture,
   b) heating said precursor mixture to a temperature of at least 400° C., in the presence of a gas comprising hydrogen ($H_2$), to provide said alloy nanoparticles,
   wherein the nitrogen-rich organic compound has a chemical formula with a stoichiometric ratio between carbon to nitrogen of 6:1-1:4 and, wherein the nitrogen-rich organic compound is a compound selected from the group consisting of cyanamide ($NH_2CN$), dicyandiamide (($H_2N)_2C=NCN$), melamine ($C_3H_6N_6$), carbon nitrides, ethylenediamine ($C_2H_8N_2$), 1,10-phenanthroline ($C_{12}H_8N_2$), histidine ($C_6H_9N_3O_2$), 2,2'-bipyridine ($C_{10}H_8N_2$), 2,5-dimethylpyrrole ($C_6H_9N$), maleimide ($C_4H_3NO_2$), imidazole ($C_3H_4N_2$), polyacrylonitrile ($C_3H_3N$), and thiourea ($CH_4N_2S$).

15. The process according to claim 14, wherein the process further comprises:
   c) contacting said alloy nanoparticles with a solution comprising an acid to further purify said alloy nanoparticles.

16. The process according to claim 15, wherein the acid of step c) is an inorganic acid.

17. The process according to claim 16, wherein the inorganic acid is selected from the group consisting of sulphuric acid ($H_2SO_4$), hydrochloric acid (HCl), hydrofluoric acid (HF), nitric acid ($HNO_3$) and phosphoric acid ($H_3PO_4$).

18. The process according to claim 14, wherein the at least one first metal is selected from the group consisting of a rare earth metal, nickel (Ni), zirconium (Zr), copper (Cu) and cobalt (Co), or a mixture thereof.

19. The process according to claim 18, wherein the rare earth metal is selected from the group consisting of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

20. The process according to claim 14, wherein the salt of at least one first metal is selected from the group consisting of $GdCl_3$, $GdBr_3$, $GdI_3$, $TbCl_3$, $YCl_3$, and $NiCl_2$, or a mixtures thereof.

21. The process according to claim 14, comprising mixing a material comprising a platinum group metal, wherein the material comprising a platinum group metal is selected from the group consisting of a platinum group metal, a salt of a platinum group metal, and nanoparticles of a platinum group metal on a support material.

22. The process according to claim 14, comprising mixing a material comprising gold, wherein the material comprising gold (Au) is selected from the group consisting of a salt of gold, and nanoparticles of gold on a support material.

23. The process according to claim 14, wherein the support material is based on materials selected from the group consisting of carbon, alumina, silica, and titanium oxide, or combinations thereof.

24. The process according to claim 14, wherein the nitrogen-rich organic compound has a chemical formula with a stoichiometric ratio between carbon to nitrogen of 2:1-1:2.

25. The process according to claim 14, wherein the heating of the precursor of step b) is performed at a temperature of 400-1000° C.

26. The process according to claim 14, wherein the salt of at least one first metal is a halogen salt.

27. The process according to claim 14, wherein the process is performed in the absence of an organic solvent.

28. A process for producing alloy nanoparticles comprising:
   a) mixing:
      a salt of at least one first metal selected from the group consisting of alkaline earth metals, transition metals, and lanthanides, or mixtures thereof,
      a material comprising a platinum group metal selected from the group consisting of ruthenium (Ru), rhodium (Rh), palladium (Pd), Osmium (Os), iridium (Ir) and platinum (Pt), or a material comprising gold (Au),
      a nitrogen-rich organic compound, and
      a support material,
      to provide a precursor mixture,
   b) heating said precursor mixture to a temperature of at least 400° C., in the presence of a gas comprising hydrogen ($H_2$), to provide said alloy nanoparticles, wherein the nitrogen-rich organic compound has a chemical formula with a stoichiometric ratio between carbon to nitrogen of 6:1-1:4 and, wherein the process is performed in the absence of an organic solvent.

29. The process according to claim 28, wherein the process further comprises:
   c) contacting said alloy nanoparticles with a solution comprising an acid to further purify said alloy nanoparticles.

30. The process according to claim 29, wherein the acid of step c) is an inorganic acid.

31. The process according to claim 30, wherein the inorganic acid is selected from the group consisting of sulphuric acid ($H_2SO_4$), hydrochloric acid (HCl), hydrofluoric acid (HF), nitric acid ($HNO_3$) and phosphoric acid ($H_3PO_4$).

32. The process according to claim 28, wherein the at least one first metal is selected from the group consisting of a rare earth metal, nickel (Ni), zirconium (Zr), copper (Cu) and cobalt (Co), or a mixture thereof.

33. The process according to claim 32, wherein the rare earth metal is selected from the group consisting of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

34. The process according to claim 28, wherein the salt of at least one first metal is selected from the group consisting of $GdCl_3$, $GdBr_3$, $GdI_3$, $TbCl_3$, $YCl_3$, and $NiCl_2$, or a mixtures thereof.

35. The process according to claim 28, comprising mixing a material comprising a platinum group metal, wherein the material comprising a platinum group metal is selected from the group consisting of a platinum group metal, a salt of a platinum group metal, and nanoparticles of a platinum group metal on a support material.

36. The process according to claim 28, comprising mixing a material comprising gold, wherein the material comprising gold (Au) is selected from the group consisting of a salt of gold, and nanoparticles of gold on a support material.

37. The process according to claim 28, wherein the support material is based on materials selected from the group consisting of carbon, alumina, silica, and titanium oxide, or combinations thereof.

38. The process according to claim 28, wherein the nitrogen-rich organic compound has a chemical formula with a stoichiometric ratio between carbon to nitrogen of 2:1-1:2.

39. The process according to claim 28, wherein the heating of the precursor of step b) is performed at a temperature of 400-1000° C.

40. The process according to claim 28, wherein the salt of at least one first metal is a halogen salt.

41. The process according to claim 28, wherein the nitrogen-rich organic compound is a compound selected from the group consisting of cyanamide ($NH_2CN$), dicyandiamide (($H_2N)_2C=NCN$), melamine ($C_3H_6N_6$), carbon nitrides, ethylenediamine ($C_2H_8N_2$), 1,10-phenanthroline ($C_{12}H_8N_2$), histidine ($C_6H_9N_3O_2$), 2,2'-bipyridine ($C_{10}H_8N_2$), 2,5-dimethylpyrrole ($C_6H_9N$), maleimide ($C_4H_3NO_2$), imidazole ($C_3H_4N_2$), polyacrylonitrile ($C_3H_3N$), and thiourea ($CH_4N_2S$).

* * * * *